J. H. ALEXANDER.
Wrench.

No. 226,149. Patented April 6, 1880.

Witnesses:
Henry Eichling
B. E. Clark

Inventor:
James H. Alexander
By Fitch & Fitch
his attorneys.

UNITED STATES PATENT OFFICE.

JAMES H. ALEXANDER, OF MYSTIC RIVER, CONNECTICUT.

WRENCH.

SPECIFICATION forming part of Letters Patent No. 226,149, dated April 6, 1880.

Application filed November 29, 1879.

*To all whom it may concern:*

Be it known that I, JAMES H. ALEXANDER, of Mystic River, New London county, State of Connecticut, have invented a new and useful Improvement in Wrenches, of which the following is a specification, reference being had to the accompanying drawings, forming part of the same, in which—

Figure 1:
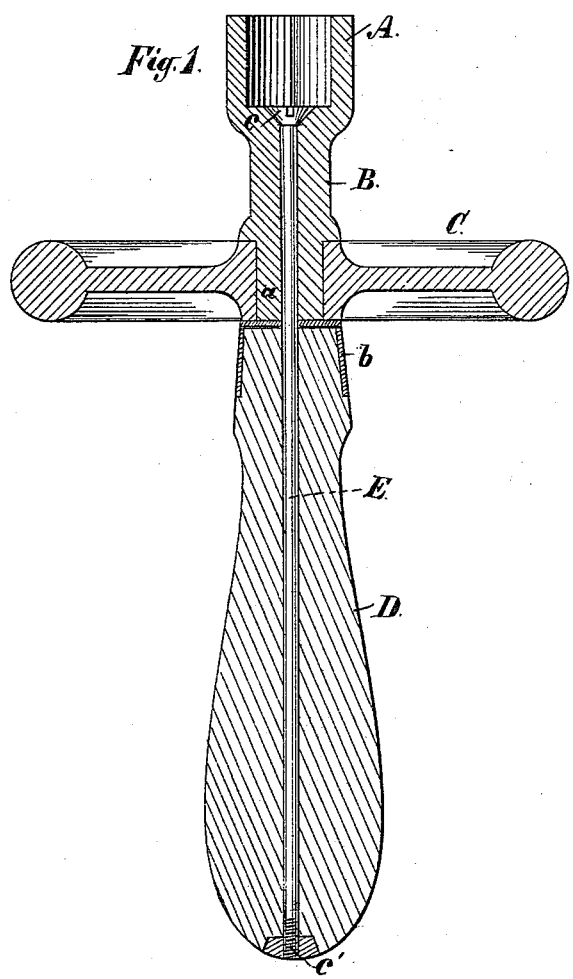
Figure 2:
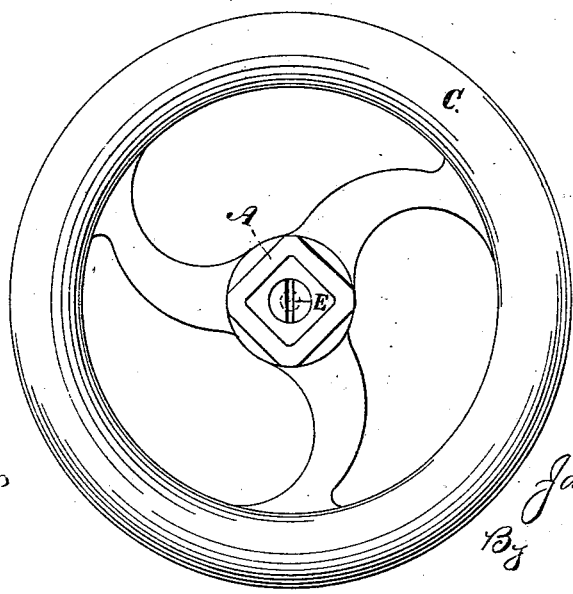

Figure 1 is a central longitudinal section of a wrench containing my invention, and Fig. 2 a socket-end view of the same.

My invention consists in the combination, with a wrench, of a handle pivoted to the wrench, the socket being provided with a hand-wheel or its equivalent, whereby the socket may be rotated while the handle is held at rest, as hereinafter described and claimed.

A represents the socket, and B the shank, of the wrench, made of malleable iron, the socket being made of a suitable size to fit the nuts upon which it is designed to operate.

C is a hand-wheel that is fixed upon the shank B. By forming the end $a$ of said shank square or irregular and making the central hole in the wheel to fit such shank the wheel will rotate the shank without other device for connecting the wheel to the shank.

D is the handle, which may be either of wood or metal. Preferably it is provided with a ferrule or cap, $b$, on the end next the wheel to strengthen it and provide against wear.

E is an axle-rod, which passes through the axis of the shank B and the handle C, it being provided with a head, $c$, at one end and a screw-thread and nut, $c'$, at the other, whereby the handle is connected to the socket, shank, and wheel, and the latter are permitted to revolve, while the handle is held at rest in the hand. In place of this rod running entirely through the handle, a strong screw may be inserted with its head and turn in the axial aperture in the shank $a$ and its thread screwed into the handle. The rod, as shown in the drawings, is, however, preferable for strength and durability.

This wrench is specially useful for putting on and taking off the nuts of wagon-axles.

What I claim as my invention, and desire to secure by Letters Patent, is—

A wrench composed of the socket A, shank B, wheel C, handle D, and rod or screw E, all constructed and combined to operate as described.

JAMES H. ALEXANDER.

Witnesses:
 JOHN S. HEATH,
 LEMUEL CLIFT.